United States Patent
Hamashima

(10) Patent No.: US 11,958,263 B2
(45) Date of Patent: Apr. 16, 2024

(54) MOLDING DIE AND MANUFACTURING METHOD FOR THE SAME

(71) Applicant: KYOCERA Corporation, Kyoto (JP)

(72) Inventor: Hiroshi Hamashima, Hikone (JP)

(73) Assignee: KYOCERA CORPORATION, Kyoto (JP)

(*) Notice: Subject to any disclaimer, the term of this patent is extended or adjusted under 35 U.S.C. 154(b) by 266 days.

(21) Appl. No.: 17/629,120

(22) PCT Filed: Jul. 16, 2020

(86) PCT No.: PCT/JP2020/027673
§ 371 (c)(1),
(2) Date: Jan. 21, 2022

(87) PCT Pub. No.: WO2021/015092
PCT Pub. Date: Jan. 28, 2021

(65) Prior Publication Data
US 2022/0281200 A1     Sep. 8, 2022

(30) Foreign Application Priority Data

Jul. 25, 2019  (JP) ................................. 2019-136950

(51) Int. Cl.
*B30B 15/02*     (2006.01)
*B22F 3/02*     (2006.01)
*B22F 5/00*     (2006.01)
*B30B 11/02*     (2006.01)

(52) U.S. Cl.
CPC ............... *B30B 11/02* (2013.01); *B22F 3/02* (2013.01); *B22F 5/00* (2013.01)

(58) Field of Classification Search
CPC ................................ B22F 3/03; B30B 15/022
See application file for complete search history.

(56) References Cited

FOREIGN PATENT DOCUMENTS

| JP | 2002-195266 A | 7/2002 |
|---|---|---|
| JP | 2004-211775 A | 7/2004 |

*Primary Examiner* — James Sanders
(74) *Attorney, Agent, or Firm* — Procopio, Cory, Hargreaves & Savitch LLP

(57) ABSTRACT

A molding die according to the present disclosure includes a tubular portion and a base portion that closes an end portion of the tubular portion at one side. A cut level difference $R\delta c_1$ in a roughness curve of an inner wall surface of the tubular portion is smaller than a cut level difference $R\delta c_2$ in a roughness curve of an inner wall bottom portion of the base portion. The cut level difference represents a difference between a cut level at a load length ratio of 25% in a roughness curve and a cut level at a load length ratio of 75% in the roughness curve.

16 Claims, 2 Drawing Sheets

MOLDING DIE AND MANUFACTURING METHOD FOR THE SAME

TECHNICAL FIELD

The present disclosure relates to a molding die and a manufacturing method for the same.

BACKGROUND ART

In recent years, there has been a demand for a metal member having a cylindrical shape or cylindrical column shape with a controlled surface texture on an outer peripheral surface. Such a member includes, for example, a cylindrical base for an electrophotographic photoreceptor, a roller for a roller bearing, a sliding bearing for a roller follower, a cylindrical-shaped case that houses a filter, or the like. Patent Document 1 discloses a roller bearing that includes a roller of which an outer peripheral surface has a surface roughness that falls within a predetermined criterion value. Patent Document 2 proposes a roller follower in which a sliding bearing is in sliding contact with an outer peripheral surface of a supporting shaft as well as an inner peripheral surface of a roller, and an end surface of the plain bearing in the axial direction includes a rough surface having a surface roughness greater than that of an end surface of the roller in the axial direction, and is in contact with an inner surface of a side wall.

CITATION LIST

Patent Literature

Patent Document 1: JP 2002-195266 A
Patent Document 2: JP 2004-211775 A

SUMMARY OF INVENTION

A molding die according to the present disclosure includes a tubular portion and a base portion that closes an end portion of the tubular portion at one side. A cut level difference $R\delta c_1$ in a roughness curve of an inner wall surface of the tubular portion is smaller than a cut level difference $R\delta c_2$ in a roughness curve of an inner wall bottom portion of the base portion. The cut level difference represents a difference between a cut level at a load length ratio of 25% in a roughness curve and a cut level at a load length ratio of 75% in the roughness curve.

In addition, a manufacturing method for the molding die according to the present disclosure includes: attaching water to at least one of a first opposing surface of the tubular portion that faces the base portion or a second opposing surface of the base portion that faces the tubular portion; causing adsorption of the tubular portion and the base portion; and applying pressure from a longitudinal direction and performing thermal treatment.

DESCRIPTION OF EMBODIMENTS

A member having a controlled surface texture on an outer peripheral surface is molded, for example, using a molding die. The molding die is manufactured by drilling or polishing a material of the molding die in accordance with a desired member. The inner wall surface of the thus obtained molding die has scratches or cutting marks formed at the time of manufacturing the molding die. Thus, while the inner wall surface of the molding die visually looks smooth, it actually has very small unevenness. Thus, a member obtained by using such a molding die may be unsatisfactory in terms of a desired surface texture.

In a case of the molding die according to the present disclosure, a cut level difference $R\delta c_1$ in a roughness curve of an inner wall surface of a tubular portion is smaller than a cut level difference $R\delta c_2$ in a roughness curve of an inner wall bottom portion of a base portion, as described above. Thus, by molding a member using the molding die according to the present disclosure, it is possible to obtain a member having a tubular shape (including a closed-bottom tubular shape) or a columnar shape and including an outer wall surface having a highly precisely controlled surface texture.

Figure 1:
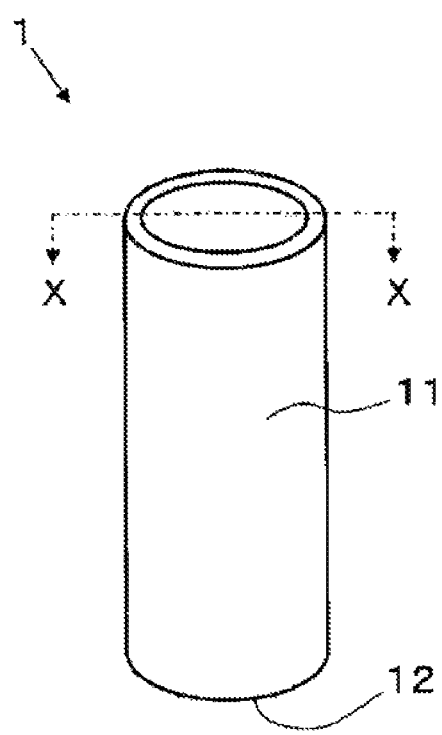
FIG. 1 is a perspective view illustrating a molding die according to an embodiment of the present disclosure.

A molding die according to an embodiment of the present disclosure will be described with reference to FIGS. 1 and 2. A molding die 1 according to the embodiment illustrated in FIG. 1 includes a tubular portion 11 and a base portion 12. There is no limitation regarding the material of the tubular portion 11 included in the molding die 1 according to the embodiment. The material of the tubular portion 11 may be, for example, a ceramic having a main constituent including aluminum oxide, silicon carbide, or silicon nitride. Of these materials, it is preferable that the molding die be made out of a ceramic having a main constituent of aluminum oxide. This is because, at the time of manufacturing the molding die, machining such as polishing or cutting can be easily performed, and the primary raw material is inexpensive. For the purpose of convenience, the ceramic used for the tubular portion 11 is referred to as the "first ceramic" in the present specification.

The size of the tubular portion 11 is not particularly limited. The size is set appropriately in accordance with a desired member. In a case where the tubular portion 11 has a cylindrical shape as illustrated in FIG. 1, the tubular portion 11 has, for example, an outer diameter not less than 32 mm and not more than 50 mm and an inner diameter not less than 25 mm and not more than 30 mm. For example, the tubular portion 11 has a length not less than 100 mm and not more than 200 mm.

The base portion 12 included in the molding die 1 according to the embodiment is provided so as to close an end portion of the tubular portion 11 at one side. For example, in a case where the outer diameter of the base portion 12 is smaller than the outer diameter of the tubular portion 11, a space is created at the end portion of the tubular portion 11 at one side, which makes it impossible to close it. In order to avoid the creation of the space as described above, it is preferable that the outer diameter of the base portion 12 be substantially equal to the outer diameter of the tubular portion 11; however, it may be greater. Specifically, it is preferable that the base portion 12 be provided at the tubular portion 11 in a manner such that the shape of an opening 121 of the base portion 12 is identical to the shape of an opening 111 of the tubular portion 11, and the thickness of an inner wall surface 122 of the base portion 12 is equal to the thickness of an inner wall surface 112 of the tubular portion, as illustrated in FIG. 2. The dashed line illustrated in FIG. 2 indicates an opposing surface 13 between the tubular portion 11 and the base portion 12.

It is more preferable that an inner diameter $ID_2$ of a second opposing surface 132 of the base portion 12 that faces the tubular portion 11 be smaller than an inner diameter $ID_1$ of a first opposing surface 131 of the tubular portion 11 that faces the base portion 12. In a case where a metal member having a cylindrical shape or a cylindrical column shape is obtained by using the molding die having the configuration as described above, it is possible to prevent the metal member from getting caught on the base portion 11. Thus, the member can be easily removed from the molding die. The difference between the inner diameter $ID_2$ and the inner diameter $ID_1$ is, for example, not less than 0.2 mm and not more than 0.5 mm.

There is no limitation regarding the material of the base portion 12 included in the molding die 1 according to the embodiment. For example, the material of the base portion 12 includes a material used for the tubular portion 11 described above, and it is preferable that the tubular portion 11 and the base portion 12 use a material having the same main constituent. It is preferable to use a ceramic for the material of the base portion 12 as with the tubular portion 11. In the present specification, the ceramic used for the base portion 12 is referred to as a "second ceramic" for the purpose of convenience. In a case where a ceramic is used as a material for the tubular portion 11 and the base portion 12, the first ceramic and the second ceramic may be ceramics having the same main constituent, or may be ceramics having different main constituents.

In the present specification, the "main constituent" means a constituent that accounts for not less than 80 mass % of the total of 100 mass % of the constituent that constitutes the ceramic. Each constituent contained in the ceramic can be identified with an X-ray diffractometer using a CuKα beam. The content of each constituent can be determined by using, for example, an inductively coupled plasma (ICP) emission spectrophotometer or a fluorescent X-ray analysis device.

The shape of the base portion 12 is not limited, provided that the shape allows an end portion of the tubular portion 11 at one end to be closed. The base portion 12 included in the molding die 1 according to the embodiment has a recessed shape that opens toward the tubular portion 11 as illustrated in FIG. 2. An inner wall surface of the base portion 12 having the recessed shape may be sloped from the opening 121 toward an inner wall bottom portion 122a, and the slope may have a rounded shape.

The interior of the tubular portion 11 and the interior of the base portion 12 are cut or polished into a shape that corresponds to a desired member. In the molding die 1 according to the embodiment, a cut level difference $R\delta c_1$ in a roughness curve of the inner wall surface 112 of the tubular portion 11 is smaller than a cut level difference $R\delta c_2$ in a roughness curve of the inner wall bottom portion 122a of the base portion 12. The cut level difference $R\delta c$ in a roughness curve is an index indicating a difference in the height direction between cut levels C (Rrm1) and C (Rrm2) that coincide with respective load length ratios Rmr1 and Rmr2 in a roughness curve specified in JIS B0601: 2001, and the smaller the value, the smoother the front surface and the less the unevenness of the front surface. That is, the inner wall surface 112 of the tubular portion 11 is smoother and less uneven than the inner wall bottom portion 122a of the base portion 12.

In the present specification, the "cut level difference $R\delta c_1$" means the difference between a cut level at a load length ratio of 25% in the roughness curve for the inner wall surface 112 of the tubular portion 11 and a cut level at a load length ratio of 75% in the roughness curve. On the other hand, in the present specification, the "cut level difference $R\delta c_2$" means the difference between a cut level at a load length ratio of 25% in the roughness curve for the inner wall bottom portion 122a of the base portion 12 and a cut level at a load length ratio of 75% in the roughness curve.

The cut level difference $R\delta c_1$ in the roughness curve of the inner wall surface 112 of the tubular portion 11 is smaller than the cut level difference $R\delta c_2$ in the roughness curve of the inner wall bottom portion 122a of the base portion 12. Thus, the inner wall surface 112 of the tubular portion 11 is less uneven and is smoother than the inner wall bottom portion 122a of the base portion 12. The configuration as described above can be applied to a member that is required to have an outer wall surface having a more highly precise surface texture (cut level difference $R\delta c$) than an end surface, examples of the member including a cylindrical base for an electrophotographic photoreceptor, a roller of a roller bearing, a sliding bearing of a roller follower, a cylindrical case that houses a filter, or the like (hereinafter, these members may be simply referred to as a "cylindrical base for an electrophotographic photoreceptor or the like").

In a case where a powder made out of, for example, a metal is molded using the molding die 1 and subjected to thermal treatment, the dimension of a portion of the powder compact that is in contact with the base portion 12 is shorter than that of a portion of the powder compact that is in contact with the tubular portion 11. Thus, a shrinkage difference after the thermal treatment is small. This makes the portion of the powder compact that is in contact with the base portion 12 more likely to adhere to the base portion 12, which results in a reduction in a mold release property. Thus, the cut level difference Rδc1 in a roughness curve of the inner wall surface 112 of the tubular portion 11 is set to be smaller than the cut level difference Rδc2 in a roughness curve of the inner wall bottom portion 122a of the base portion 12. This improves an adherence suppressing effect at the portion that is in contact with the inner wall surface 112 having a contact surface area larger than that of the portion that is in contact with the inner wall bottom portion 122a, which makes it possible to enhance the mold release property of the powder compact. As a result, by molding and applying a thermal treatment to mold a powder made out of, for example, a metal by using the molding die 1 according to the embodiment, it is possible to easily obtain a member having a tubular shape (including a closed-bottom tubular shape) or a columnar shape and including an outer wall surface having a highly precisely controlled surface texture.

As long as the cut level difference $R\delta c_1$ is smaller than the cut level difference $R\delta c_2$, the difference between them is not limited. For example, the difference between the cut level difference $R\delta c_1$ and the cut level difference $R\delta c_2$ may be equal to or more than 0.2 μm. By setting the difference between the cut level difference $R\delta c_1$ and the cut level difference $R\delta c_2$ to be equal to or more than 0.2 μm in this manner, the inner wall surface 112 of the tubular portion 11 can be further less uneven and further smoother than the inner wall bottom portion 122a of the base portion 12. In addition, this increases the cut level difference $R\delta c_2$ of the inner wall bottom portion 122a that is hard to clean, and the hydrophilicity of the inner wall bottom portion 122a is higher than that of the inner wall surface 112, which improves cleaning efficiency. Such a range is more preferable for a cylindrical base for an electrophotographic photoreceptor or other members that are required to have an outer wall surface having a more highly precise surface texture (cut level difference Rδc) than an end surface.

The cut level difference $R\delta c_2$ of the inner wall bottom portion 122a is, for example, not less than 0.6 μm and not more than 2.5 μm. In a case where the cut level difference $R\delta c_2$ is equal to or more than 0.6 µm, the hydrophilicity improves, thereby improving the efficiency of cleaning. In a case where the cut level difference $R\delta c_2$ is equal to or less than 2.5 µm, the likelihood of powder detached from the powder compact adhering to the bottom of the ravine of the front surface of the inner wall bottom portion 122a is reduced, which makes it easy to perform continuous molding of the powder compact. In a case where the cut level difference $R\delta c_2$ is equal to or more than 0.6 µm, it is possible to set the contact angle relative to pure water to be, for example, equal to or more than 45°.

In addition, in the molding die 1 according to one embodiment, there is no limitation as to an arithmetic mean roughness $Ra_1$ of the inner wall surface 112 of the tubular portion 11 and an arithmetic mean roughness $Ra_2$ of the inner wall bottom portion 122a of the base portion 12. In a case where a powder made out of, for example, a metal is molded and subjected to a thermal treatment by using the molding die 1, it is preferable that the arithmetic mean roughness $Ra_1$ of the inner wall surface 112 of the tubular portion 11 be smaller than the arithmetic mean roughness $Ra_2$ of the inner wall bottom portion 122a of the base portion 12 from the viewpoint of easily obtaining a member having a tubular shape (including a closed-bottom tubular shape) or a columnar shape and including an outer wall surface having a highly precisely controlled surface texture while favorably maintaining the mold release property at the base portion 12. The configuration as described above can be applied to a member, such as a cylindrical base for an electrophotographic photoreceptor, that is required to have an outer wall surface having a more highly precise surface texture (arithmetic mean roughness Ra in addition to the cut level difference Rδc) than an end surface. Specifically, it is preferable that the difference between the arithmetic mean roughness $Ra_1$ and the arithmetic mean roughness $Ra_2$ is equal to or more than 0.2 µm.

The arithmetic mean roughness $Ra_2$ of the inner wall bottom portion 122a is, for example, not less than 0.6 µm and not more than 1.6 µm. In a case where the arithmetic mean roughness $Ra_2$ is equal to or more than 0.6 µm, the hydrophilicity improves, and hence, the cleaning efficiency further improves. In a case where the arithmetic mean roughness $Ra_2$ is equal to or less than 1.6 µm, the likelihood of powder detached from the powder compact adhering to the bottom of the valley of the front surface of the inner wall bottom portion 122a is reduced, which makes it further easier to perform continuous molding of the powder compact. In a case where the cut level difference $R\delta c_2$ is equal to or more than 0.6 µm, it is possible to set the contact angle relative to pure water to be, for example, equal to or less than 40°.

For a reason similar to the reason described above, it may be possible to set the cut level difference $R\delta c_1$ to be smaller than a cut level difference $R\delta c_3$ in a roughness curve of the inner wall surface 122 of the base portion 12 that is sloped from the opening toward the inner wall bottom portion 122a. A difference between the cut level difference $R\delta c_1$ and the cut level difference $R\delta c_3$ may be equal to or more than 0.2 µm. The cut level difference $R\delta c_3$ may be not less than 0.6 µm and not more than 2.5 µm.

The cut level difference $R\delta c_1$, the cut level difference $R\delta c_2$, the cut level difference $R\delta c_3$, the arithmetic mean roughness $Ra_1$, the arithmetic mean roughness $Ra_2$, and the arithmetic mean roughness $Ra_1$ can be measured in accordance with JIS B 0601-2001 using a laser microscope (manufactured by Keyence Corporation, an ultra-deep color 3D shape measurement microscope (VK-X1100 or successor models thereof)). The surface roughness can be measured under conditions in which: coaxial illumination is used for illumination; a cutoff value λs does not exist; a cutoff value λc is set to 0.08 mm; correction of termination effect is enabled; a measurement range per location from the inner wall surface 112, the inner wall bottom portion 122a, or the inner wall surface 122 to be measured is set to 2792 µm×2090 µm; and for each measurement range, four lines serving as measurement targets are drawn along a longitudinal direction of the measurement range. The length per line serving as the measurement target is, for example, 2640 µm.

There is no limitation regarding the method of manufacturing the molding die 1 according to the embodiment. In a case where a ceramic is used as a material for the tubular portion 11 and the base portion 12, the molding die 1 according to the embodiment can be obtained, for example, through the following procedure.

Description will be made of a case where the tubular portion 11 and the base portion 12 are made out of a ceramic having a main constituent of aluminum oxide. A powder (at a purity not less than 99.9%) of aluminum oxide serving as the main constituent and each powder of magnesium hydroxide, silicon oxide, and calcium carbonate are fed into a grinding mill together with solvent (ion exchange water). Then, grinding is performed until the average grain size ($D_{50}$) of the powder becomes equal to or less than 1.5 µm. An organic binder and a dispersant that cause the powder of aluminum oxide to disperse are added and are mixed to obtain a slurry. Here, of the total of 100 mass % of the powder described above, the content of magnesium hydroxide powder falls in a range of 0.3 to 0.42 mass %; the content of silicon oxide powder falls in a range of 0.5 to 0.8 mass %; the content of calcium carbonate powder falls in a range of 0.060 to 0.1 mass %; and the remainder includes aluminum oxide powder and inevitable impurities.

The organic binder includes acrylic emulsion, polyvinyl alcohol, polyethylene glycol, polyethylene oxide, or the like. Next, the slurry is spray-granulated to obtain granules. In a case of obtaining the tubular portion 11, the granules are charged into a mold. The molding pressure is set to be not less than 78 MPa and not more than 128 MPa to apply pressure to the granules, which makes it possible to obtain a powder compact having a tubular shape. The powder compact is maintained at a temperature not less than 1500° C. and not more than 1700° C. for not less than four hours and not more than six hours. This makes it possible to obtain a first ceramic that is a precursor of the tubular portion 11.

The inner wall surface 112 of the tubular portion 11 can be obtained, for example, by cutting the inner wall surface of the first ceramic using a honing machine. In a case of cutting the inner wall surface of the first ceramic, a grindstone containing diamond abrasive grains with a particle size of #800 to #1200 according to JIS R 6001-2: 2017 can be mounted in the honing machine to perform cutting.

Next, in a case of obtaining the base portion 12, the granules are first charged into the mold. Then, pressure is applied to the granules with the molding pressure set to be not less than 78 MPa and not less more than 128 MPa, which makes it possible to obtain a powder compact having a sheet shape. Cutting processing is performed on the top surface of the powder compact to form a portion that is to be the inner wall bottom portion 112a of the base portion 12 after firing. The powder compact that has been subjected to the cut processing is maintained at a temperature not less than 1500° C. and not more than 1700° C. for not less than four hours and not more than six hours. This makes it possible to obtain a second ceramic that is a precursor of the base portion 12.

Then, a diamond paste is applied to a buff to polish the inner wall bottom portion of the second ceramic to the extent that burrs are removed. As for the diamond paste, a paste in which a powder of diamond having an average grain size not less than 1 μm and not more than 4 μm is dispersed in an organic solvent can be used.

By using the manufacturing method described above, it is possible to obtain a molding die in which the cut level difference $R\delta c_1$ in a roughness curve of the inner wall surface 112 of the tubular portion 11 is smaller than the cut level difference $R\delta c_2$ in a roughness curve of the inner wall bottom portion 112a of the base portion 12.

There is no limitation regarding the ceramic. For example, the ceramic may be a ceramic having a main constituent of aluminum oxide as described above or a ceramic having silicon carbide or silicon nitride as the main constituent.

The ceramic is as described above. The second ceramic may be the same ceramic as the first ceramic, or may be a different ceramic. From the viewpoint of a machined surface or a work surface, it is preferable that the first ceramic and the second ceramic are ceramics having the same main constituent.

In order to obtain a molding die in which a difference between the cut level difference $R\delta c_1$ and the cut level difference $R\delta c_2$ is equal to or more than 4 μm, the following method can be employed, for example. First, the second ceramic is polished using the method described above. Then, a grindstone containing diamond abrasive grains having a particle size of #800 to #1000 can be mounted in a honing machine to polish the inner wall surface of the first ceramic.

In order to obtain a molding die in which the arithmetic mean roughness $Ra_1$ of the inner wall surface 112 of the tubular portion 11 is smaller than the arithmetic mean roughness $Ra_2$ of the inner wall bottom portion 112a of the base portion 12, the following method can be used, for example. First, a grindstone containing diamond abrasive grains having a particle size of #800 to #1200 is mounted in a honing machine to polish the inner wall surface of the first ceramic. Then, the inner wall bottom portion of the second ceramic can be polished using a paste in which a powder of diamond having an average grain size not less than 2 μm and not more than 4 μm is dispersed in an organic solvent.

In order to obtain a molding die in which a difference between the arithmetic mean roughness $Ra_1$ and the arithmetic mean roughness $Ra_2$ is equal to or more than 1.4 μm, the following method can be used, for example. First, a grindstone containing diamond abrasive grains having a particle size of #800 to #1000 is mounted in a honing machine to polish the inner wall surface of the first ceramic. Then, the inner wall bottom portion of the second ceramic can be polished using a paste in which a powder of diamond having an average grain size not less than 2 μm and not more than 4 μm is dispersed in an organic solvent.

Figure 2:
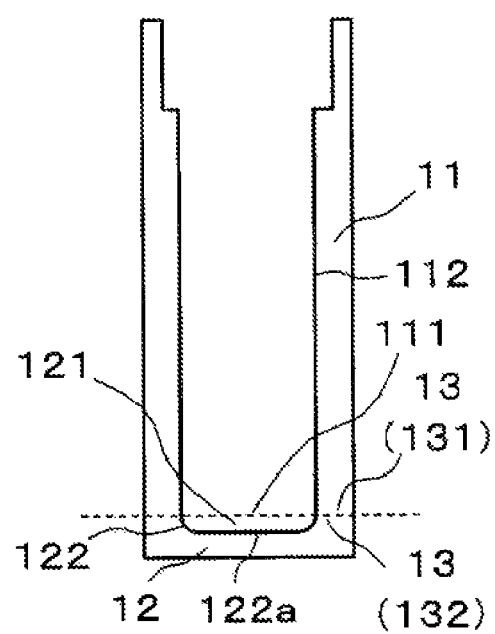
FIG. 2 is an explanatory diagram illustrating a cross section taken along the line X-X illustrated in FIG. 1.

As illustrated in FIG. 2, the outer diameter of the base portion 12 is substantially equal to the outer diameter of the tubular portion 11. In addition, the shape of the opening 121 of the base portion 12 is identical to the shape of the opening 111 of the tubular portion 11, and the thickness of the inner wall surface 122 of the base portion 12 is identical to the thickness of the inner wall surface 112 of the tubular portion 11.

There is no limitation regarding the method of bonding the tubular portion 11 and the base portion 12, and for example, the following method (diffused junction) can be used. First, water is attached to at least one of a first opposing surface 131 of the tubular portion 11 that faces the base portion 12 and a second opposing surface 132 of the base portion 12 that faces the tubular portion 11. There is no limitation regarding the method of attaching water. Examples of the method include spraying water onto at least one of the first opposing surface 131 and the second opposing surface 132, applying water using a brush or the like, and direct immersion in water.

The first opposing surface 131 can be obtained, for example, by, before water is attached, supplying a lapping machine made of copper, tin, or a tin-lead alloy with a slurry containing diamond having an average grain size not less than 0.5 μm and not more than 3 μm, at predetermined time intervals, and polishing an end surface of the tubular portion 11 that faces the base portion 12. The second opposing surface 132 can be obtained, for example, by, before water is attached, supplying a lapping machine made of copper, tin, or a tin-lead alloy with a slurry containing diamond having an average grain size not less than 0.5 μm and not more than 3 μm, at predetermined time intervals, and polishing an end surface of the base portion 12 that faces the tubular portion 11. The arithmetic mean roughness Ra of each of the first opposing surface 131 and the second opposing surface 132 is, for example, equal to or less than 0.2 μm.

Water is attached to at least one of the first opposing surface 131 and the second opposing surface 132, and then, the first opposing surface 131 and the second opposing surface 132 are adsorbed to each other. After this, thermal treatment is performed while the adsorbing surfaces are being pressed. The strength of the pressing is not limited, and is set appropriately in accordance with the size or material of the tubular portion 11 or the base portion 12. Specifically, it is preferable to apply a pressure of approximately 1 kgf to 5 kgf. The thermal treatment is set appropriately in accordance with the size or material of the tubular portion 11 or the base portion 12. Specifically, it is preferable to perform the thermal treatment at not less than 1000° C. and not more than 1800° C. The thermal treatment can be performed, for example, for approximately 30 minutes to 120 minutes. In this manner, the molding die 1 according to the embodiment is manufactured.

The molding die according to the present disclosure is not limited to the embodiment described above. For example, the molding die 1 described above includes the tubular portion 11 having a cylindrical shape. However, the tubular portion is not limited to a cylindrical shape, and may have an elliptic columnar shape, or may have a prism shape having a triangular shape, a quadrilateral shape, a pentagonal shape, or a hexagonal shape in cross section.

The molding die 1 described above has a recessed shape in which the base portion 12 is open toward the tubular portion 11. However, the shape of the base portion is not limited to a recessed shape, and may be set appropriately in accordance with the shape of the desired member. For example, the base portion may have a flat plate shape like a bottom plate. In addition, the inner wall surface 122 of the base portion 12 is configured such that a slope from the opening 121 toward the inner wall bottom portion 122a has a rounded shape. However, the slope does not need to have a rounded shape, and is set appropriately in accordance with the shape of the desired member. The inner wall surface 122 of the base portion 12 may be orthogonal from the opening 121 to the inner wall bottom portion 122a in accordance with the shape of the desired member.

REFERENCE SIGNS LIST

1 Molding die
11 Tubular portion
111 Opening of tubular portion
112 Inner wall surface of tubular portion
12 Base portion
121 Opening of base portion
122 Inner wall surface of base portion
122a Inner wall bottom portion of base portion
13 Opposing surface
131 First opposing surface
132 Second opposing surface

The invention claimed is:

1. A molding die comprising:
a tubular portion; and
a base portion configured to close an end portion of the tubular portion, wherein
a cut level difference $R\delta c_1$ in a roughness curve of an inner wall surface of the tubular portion is smaller than a cut level difference $R\delta c_2$ in a roughness curve of an inner wall bottom portion of the base portion, and
a cut level difference is defined by a difference between a cut level at a load length ratio of 25% in a roughness curve and a cut level at a load length ratio of 75% in the roughness curve.

2. The molding die according to claim 1, wherein a difference between the cut level difference $R\delta c_1$ and the cut level difference $R\delta c_2$ is equal to or more than 0.2 μm.

3. The molding die according to claim 1, wherein the cut level difference $R\delta c_2$ is not less than 0.6 μm and not more than 2.5 μm.

4. The molding die according to claim 1, wherein an arithmetic mean roughness $Ra_1$ of the inner wall surface of the tubular portion is smaller than an arithmetic mean roughness $Ra_2$ of the inner wall bottom portion of the base portion.

5. The molding die according to claim 4, wherein a difference between the arithmetic mean roughness $Ra_1$ and the arithmetic mean roughness $Ra_2$ is equal to or more than 0.2 μm.

6. The molding die according to claim 4, wherein the arithmetic mean roughness $Ra_2$ is not less than 0.6 μm and not more than 1.6 μm.

7. The molding die according to claim 1, wherein the base portion has a recessed shape that has an opening toward the tubular portion.

8. The molding die according to claim 7, wherein an inner wall surface of the base portion having the recessed shape includes a slope that is sloped from the opening toward the inner wall bottom portion of the base portion.

9. The molding die according to claim 8, wherein the slope includes a rounded shape.

10. The molding die according to claim 8, wherein the cut level difference $R\delta c_1$ is smaller than a cut level difference $R\delta c_3$ in a roughness curve of the inner wall surface of the base portion that is sloped from the opening toward the inner wall bottom portion.

11. The molding die according to claim 10, wherein a difference between the cut level difference $R\delta c_1$ and the cut level difference $R\delta c_3$ is equal to or more than 0.2 μm.

12. The molding die according to claim 10, wherein the cut level difference $R\delta c_3$ is not less than 0.6 μm and not more than 2.5 μm.

13. The molding die according to claim 5, wherein an inner diameter of a second opposing surface of the base portion that faces the tubular portion is smaller than an inner diameter of a first opposing surface of the tubular portion that faces the base portion.

14. The molding die according to claim 1, wherein the tubular portion includes a first ceramic, and the base portion includes a second ceramic.

15. A manufacturing method for the molding die according to claim 1, comprising:
attaching water to at least one of a first opposing surface of the tubular portion that faces the base portion and a second opposing surface of the base portion that faces the tubular portion;
adsorbing the tubular portion and the base portion; and
applying pressure from a longitudinal direction of the tubular portion and performing thermal treatment.

16. The manufacturing method for the molding die according to claim 15, wherein
before pressure is applied and thermal treatment is performed, polishing at least one of the first opposing surface and the second opposing surface.

* * * * *